June 12, 1945. R. D. GRAYSON 2,378,215
INSERTED TOOTH MILLING CUTTER
Filed April 3, 1944
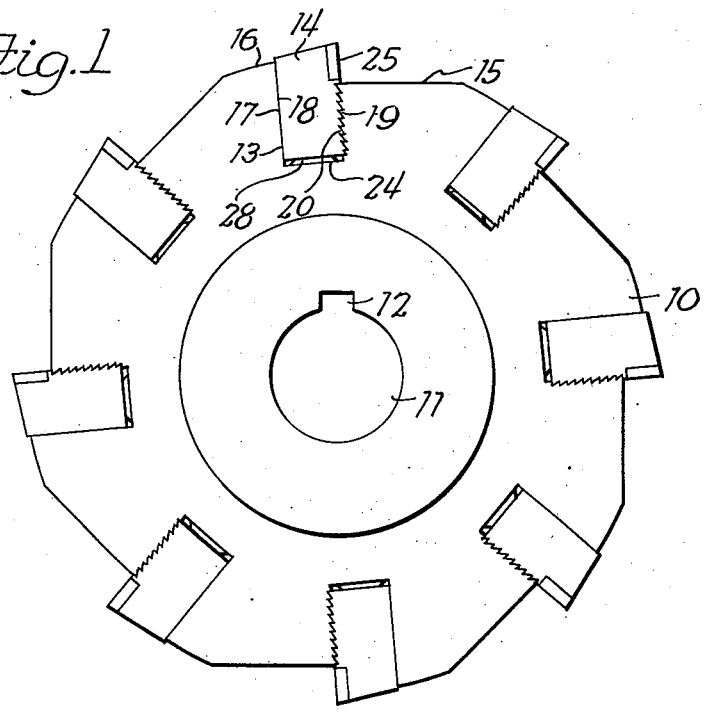
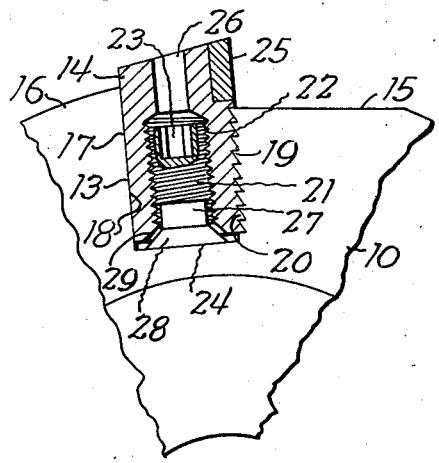
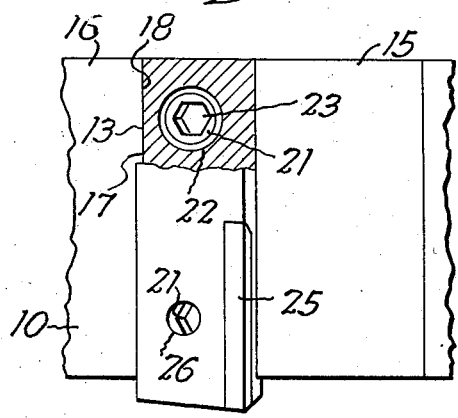
Inventor
Richard D. Grayson Patented June 12, 1945

2,378,215

UNITED STATES PATENT OFFICE 2,378,215

INSERTED TOOTH MILLING CUTTER

Richard D. Grayson, Monrovia, Calif., assignor, by mesne assignments, to Lowell & Grayson, Monrovia, Calif., a limited partnership Application April 3, 1944, Serial No. 529,282

9 Claims. (Cl. 29—105)

This invention relates to milling cutters of the inserted tooth type disclosed in the co-pending application of Edward O. Lowell, Serial No. 493,815, filed July 8, 1943.

The principal object of my invention is to provide a milling cutter of the kind mentioned, so designed and constructed that the inserted teeth may be adjusted, removed and replaced easily, and are arranged to be locked and held in place so that they are extremely rigid and there is no likelihood of vibration, freedom from vibration being particularly important where the inserted teeth are tipped with tungsten carbide or any of the other sintered carbides, because these materials are hard but not tough, and while possessing extraordinary resistance to wear, are easily broken down if subjected to excessive vibration.

The milling cutter disclosed in the Lowell application has precision flat contacting surfaces on the backs of the inserted teeth and the cooperating back walls of the slots, such contact, together with the secure wedge-locking action of interfitting serrations on the front surfaces of the inserted teeth and the front walls of the slots making for good rigidity, and eliminating danger of vibration of the inserted teeth when the inserted teeth are forced substantially radially outwardly by the tightening of a screw or screws in the teeth, against the inner ends of the slots.

A salient feature of my improved milling cutter lies in the provision of screws of novel design which, although operable through relatively small openings in the top portions of the inserted teeth by an adjusting wrench, are large enough in diameter to assume the thrust imposed thereon and have enlarged lower end portions for engagement with the inner end of the slots so as to reduce likelihood of forming depressions in the inner ends of the slots, the increased area of contact between the screw and slot giving increased assurance of rigidity, generally.

The invention is illustrated in the accompanying drawing, in which

Fig. 1 is a side view of a milling cutter made in accordance with my invention;

Fig. 2 is an enlarged detail of the cutter, showing one of the inserted teeth in section, and Fig. 3 is a plan view of the tooth shown in Fig. 2.

The same reference numerals are applied to corresponding parts in these three views.

Referring first to Fig. 1, the reference numeral 10 designates the body of a milling cutter having the usual center hole 11 and key slot 12. A plurality of substantially radial slots 13 are provided in the peripheral portion of the body in equally circumferentially spaced relation to receive the inserted teeth 14. The teeth are shown as having a negative rake angle, but where a positive rake angle is desired, the slots 13 may be inclined with respect to the radii accordingly. The teeth may also be inclined relative to the axis, if desired. The periphery of the body is cut away in front of each slot 13, as at 15, for chip clearance, but the peripheral portion 16 of the body behind each slot is not cut away, whereby to provide greater precision flat bearing surface at 17 for good rigid support of the inserted teeth 14, these teeth being provided with precision flat back surfaces 18 for contact with the flat back walls 17 of the slots. In accordance with the Lowell application, the front wall of each slot has wedge lock serrations 19 provided therein to interfit in wedge lock serrations 20 provided in the front face of the tooth 14 inserted in the slot. The teeth 14 are adapted to be inserted in the slots from either side of the body, the wedge lock serrations having a close working fit. Consequently, after the teeth have become worn and require regrinding, the teeth can be removed and replaced one or more serrations removed from the original setting and then fastened in the new setting. A pair of set screws 21 is provided in each tooth threaded in holes 22 parallel to one another and to the flat back face 18 of the tooth and the serrated front face 20 but substantially at right angles to the direction of said serrations, and these screws are provided with sockets 23 in their outer ends for application of a wrench, and are arranged to be tightened against the flat inner end wall 24 of the slot. In the tightening of the screws the slight clearance in the interfitting serrations 19 and 20 is taken up and the tooth is forced bodily against the back wall 17 of the slot with great pressure, and the tooth is therefore held firmly in place with great rigidity and there is no danger of excessive vibration during operation. I refer to these serrations as of the buttress type because of the resemblance to the shape of buttress threads, but want to point out that whereas a buttress thread exerts force with minimum wedging and friction in relation to screw pressure, the serrations 19—20 are intended to give the opposite effect and provide maximum wedging and friction in relation to the force exerted by the set screws. Centrifugal force is also an important factor tending to tighten the inserted teeth and make for greater rigidity and incidentally greater safety. The flat face contact at 17—18 is particularly important from the standpoint of rigidity, because, as should be clear, flat surfaces such as these may be produced very accurately, whereas it is not practical to cut the serrations as accurately, and in many previous constructions which require the provision of interfitting serrations on the backs of the teeth and the back walls of the slots, the contact between the teeth and the slots was sufficiently irregular to result in vibration during operation. The flat surface contact taken together with the wedge locking action reduces to a minimum the likelihood of vibration during operation, and that is particularly important where the teeth are tipped, as indicated at 25, with a cemented carbide cutting edge member, because these materials are a product of powder metallurgy and although they possess extraordinary resistance to wear they are easily broken down when subjected to excessive vibration or not supported with sufficient rigidity.

The inserted teeth 14 in accordance with my invention, have relatively small holes 26 provided in the outer end portions thereof, co-axial with and extending from the outer end of the threaded holes 22. In other words, the screws 21 are large enough in diameter to assume the thrust imposed thereon, and the holes 26 are relatively small and only large enough for the insertion of an adjusting wrench to be entered in the sockets 23 in the outer ends of the screws. Reduction in the size of the holes 26 is important from the standpoint that sufficient metal is left in the inserted teeth for rigidity and resistance to impact. The screws have short, smooth shank portions 27 on their inner ends, terminating in enlarged conical, flat-bottom base portions 28 for increased area of flat surface-to-surface engagement with the flat inner end walls 24 of the slots. In that way there is little or no likelihood of forming depressions in the bottom of the slots, and the increased width of flat surface-to-surface abutment between the screws and the bottom of the slots makes for greater rigidity and decreases likelihood of vibration during operation. The inner ends of the holes 22 are flared, as indicated at 29, to afford clearance for the conical base portions 28 of the screws.

It should be clear from the foregoing description that I have provided a milling cutter of extremely simple and practical construction, and one which insures the desired rigidity and freedom from vibration for the inserted teeth, without, however, sacrificing convenience of adjustment of the inserted teeth to maintain a diameter after grinding operations. The substantial area of contact between the set screws and the inserted teeth, taken together with the increased area of contact between the base portions of the screws and the bottoms of the slots, make for maximum rigidity of the inserted teeth, besides reducing the likelihood of the screws forming depressions in the cutter body.

It is believed the foregoing description conveys a good understanding of the objects and advantages of my invention. The appended claims have been drawn with a view to covering all legitimate modifications and adaptations.

I claim:

1. In a milling cutter of the inserted tooth type, the combination of a body member having one or more peripheral slots provided therein, inserted tooth cutting members disposed in said slots, each having means on at least one side face adapted to have locking engagement with the adjacent side wall of the slot to prevent displacement radially relative to the body and also having a relatively small opening provided in the top portion thereof adapted for the insertion of an adjusting wrench, an adjustable screw of relatively larger diameter threaded in the lower portion of the cutting member in substantially co-axial relation to said relatively small opening and adapted to have abutment on the bottom of the slot to lock the cutting member in place in the slot, the bottom portion of said screw being enlarged in relation to the pitch diameter of said screw, whereby to reduce likelihood of the screw forming any depression in the bottom of the slot.

2. In a milling cutter of the inserted tooth type, the combination of a body member having one or more peripheral slots provided therein, inserted tooth cutting members disposed in said slots, each having means on at least one side face adapted to have locking engagement with the adjacent side wall of the slot to prevent displacement radially relative to the body and also having a through-hole provided therein from top to bottom, an adjustable screw threaded in said hole and adapted to be adjusted into abutment with the bottom of the slot to lock the cutting member in place in the slot, the bottom portion of said screw being enlarged in relation to the pitch diameter of said screw, whereby to reduce likelihood of the screw forming any depression in the bottom of the slot.

3. A milling cutter of the inserted tooth type, comprising a rotatable body member provided with a substantially radial tooth receiving slot, a tooth in said slot, interfitting serrations on a wall of the slot and the adjacent face of the tooth, said serrations extending in the direction of the axis of rotation of the body, whereby the tooth is insertible and removable by movement laterally with respect to the body, and one or more fastening screws threaded in through-holes provided in the tooth in transverse relation to said serrations, said screws being threadable into engagement with the inner end of the slot to force the interfitting serrations into wedging engagement, the outer end of each of said through-holes being of relatively small diameter adapted for the insertion of an adjusting wrench, the screw being of relatively larger diameter and threading in the enlarged inner end portion of the hole, the inner end base portion of the screw being enlarged in relation to the pitch diameter of the screw, whereby to reduce likelihood of the screw forming any depression in the inner end of the slot.

4. A milling cutter of the inserted tooth type, comprising a rotatable body member provided with a substantially radial tooth receiving slot, a tooth in said slot, interfitting serrations on a wall of the slot and the adjacent face of the tooth, said serrations extending in the direction of the axis of rotation of the body, whereby the tooth is insertible and removable by movement laterally with respect to the body, and one or more fastening screws threaded in through-holes provided in the tooth in transverse relation to said serrations, said screws being threadable into engagement with the inner end of the slot to force the interfitting serrations into wedging engagement, the inner end base portion of each screw being enlarged in relation to the pitch diameter of the screw, whereby to reduce likelihood of the screw forming any depression in the inner end of the slot.

5. In a tool holder, the combination of a body having a substantially radial slot provided therein, a cutting tool adapted to be entered in said slot and having means on one side face for locking engagement in the adjacent side wall of the slot to prevent radial displacement from the slot, the cutting tool having a through-hole provided therein from top to bottom, the outer end portion of which is of relatively small diameter adapted for the insertion of an adjusting wrench, an adjustable screw of relatively larger diameter threaded in the enlarged inner end portion of said hole and adapted to be adjusted into abutment with the bottom of the slot to lock the cutting tool in place in the slot, the inner end portion of the screw being enlarged, whereby to reduce likelihood of the screw forming any depression in the bottom of the slot.

6. In a tool holder, the combination of a body having a substantially radial slot provided therein, a cutting tool adapted to be entered in said slot and having means on one side face for locking engagement in the adjacent side wall of the slot to prevent radial displacement from the slot, the cutting tool having a through-hole provided therein from top to bottom, an adjustable screw threaded in said hole and adapted to be adjusted into abutment with the bottom of the slot to lock the cutting tool in place in the slot, the inner end portion of the screw being enlarged, whereby to reduce likelihood of the screw forming any depression in the bottom of the slot.

7. In a milling cutter of the inserted tooth type, wherein each cutting member is disposed in a peripheral slot provided in the body of the cutter and has means on at least one side face adapted to have locking engagement with means on the adjacent side wall of the slot to prevent displacement of the cutting member radially relative to the body, and wherein each cutting member has a substantially radially extending opening provided therein, the upper end of which is accessible from the top of the cutting member, means for clamping each of said cutting members comprising a headless screw having a threaded shank threaded in the radial hole in the cutting member and terminating in an abutment end portion adjacent the inner end of said hole substantially larger than the pitch diameter of the thread to increase the area of its abutment and accordingly decrease the likelihood of forming depressions in the surface abutted thereby in the inner end of the slot in said cutter body, and means on the opposite end of the screw whereby said screw may be turned.

8. In a milling cutter of the inserted tooth type, wherein each cutting member is disposed in a peripheral slot provided in the body of the cutter and has means on at least one side face adapted to have locking engagement with means on the adjacent side wall of the slot to prevent displacement of the cutting member radially relative to the body, and wherein each cutting member has a substantially radially extending opening provided therein, the upper end of which is accessible from the top of the cutting member, means for clamping each of said cutting members comprising a headless metal screw adapted to be threaded in the radial hole in the cutting member, the inner abutment end of the screw being of enlarged diameter, substantially larger than the pitch diameter of the screw, the said screw having a non-circular socket in the outer end coaxially with respect to the screw and substantially smaller than the pitch diameter thereof adapted to receive a driving means for adjustment of the screw.

9. In a milling cutter of the inserted tooth type, wherein each cutting member is disposed in a peripheral slot provided in the body of the cutter and has means on at least one side face adapted to have locking engagement with means on the adjacent side wall of the slot to prevent displacement of the cutting member radially relative to the body, and wherein each cutting member has a substantially radially extending opening provided therein, the upper end of which is accessible from the top of the cutting member, means for clamping each of said cutting members comprising a headless metal screw adapted to be threaded in the radial hole in the cutting member, the inner abutment end of the screw being of enlarged diameter, substantially larger than the pitch diameter of the screw, the said screw having a non-circular socket in the outer end coaxially with respect to the screw and substantially smaller than the pitch diameter thereof adapted to receive a driving means for adjustment of the screw, the cutting member having a reduced bore in coaxial relation to said socket opening from the outer end of the threaded bore adapted for insertion therethrough of the screw driving means.

RICHARD D. GRAYSON.